United States Patent
Eschborn et al.

(10) Patent No.: US 7,658,365 B2
(45) Date of Patent: Feb. 9, 2010

(54) ASSEMBLIES AND METHODS FOR COUPLING A COMPONENT TO AN ACTUATOR

(75) Inventors: David M. Eschborn, Gilbert, AZ (US); Donald J. Christensen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 326 days.

(21) Appl. No.: 11/848,699

(22) Filed: Aug. 31, 2007

(65) Prior Publication Data
US 2009/0056507 A1 Mar. 5, 2009

(51) Int. Cl.
*F16K 31/00* (2006.01)
(52) U.S. Cl. .................... 251/267; 74/424.71
(58) Field of Classification Search ............. 251/264, 251/267, 268, 269; 74/424.71
See application file for complete search history.

(56) References Cited

U.S. PATENT DOCUMENTS

| | | | |
|---|---|---|---|
| 2,222,699 A * | 11/1940 | Ball ........................... 251/267 |
| 3,789,627 A | 2/1974 | Smith |
| 4,108,606 A | 8/1978 | Wingard |
| 4,213,480 A * | 7/1980 | Orum et al. .................. 251/267 |
| 4,346,728 A * | 8/1982 | Sulzer ......................... 251/267 |
| 4,354,350 A | 10/1982 | Tischer et al. |
| 4,376,524 A | 3/1983 | Shelton |
| 5,046,376 A * | 9/1991 | Baker ....................... 74/424.78 |
| 5,195,721 A * | 3/1993 | Akkerman ............... 74/424.82 |
| 5,377,952 A * | 1/1995 | Schabert et al. ............ 74/89.39 |
| 5,620,166 A * | 4/1997 | Lord et al. ................... 251/267 |
| 5,927,682 A | 7/1999 | Gul et al. |
| 6,056,262 A | 5/2000 | Mazur |
| 6,062,539 A | 5/2000 | Kawabe et al. |
| 6,352,239 B1 | 3/2002 | McIntosh et al. |
| 6,558,261 B1 | 5/2003 | Nelson |
| 6,578,686 B2 | 6/2003 | Nelson |
| 6,748,967 B1 | 6/2004 | Smiltneek |
| 6,939,074 B2 | 9/2005 | Gethmann |
| 6,953,182 B2 | 10/2005 | Lovell et al. |

\* cited by examiner

*Primary Examiner*—John Bastianelli
(74) *Attorney, Agent, or Firm*—Ingrassia Fisher & Lorenz, P.C.

(57) ABSTRACT

Assemblies and methods are provided for use in coupling a component to an actuator, where the component includes a stem and a drive nut, and the stem is configured to be rotated by the actuator and to move linearly through an opening in the drive nut. In an embodiment, the assembly includes a coupling mechanism, a drive ring, and a carrier, where the coupling mechanism and the carrier each include slots and the drive ring includes projections that correspond with the slots.

20 Claims, 5 Drawing Sheets

ASSEMBLIES AND METHODS FOR COUPLING A COMPONENT TO AN ACTUATOR

STATEMENT REGARDING FEDERALLY SPONSORED RESEARCH OR DEVELOPMENT

This inventive subject matter was made with Government support under N00024-04-C2118 awarded by the United States Government. The Government has certain rights in this inventive subject matter.

TECHNICAL FIELD

The inventive subject matter relates to components and actuators, and more particularly, to assemblies for coupling the rotating stems of the components to shafts of the actuators.

BACKGROUND

Myriad devices operate by converting rotational motion into linear motion. In one example, an actuator may be used to rotate a shaft that is coupled to a stem of a component. The component may be part of a gate valve, poppet valve, or any other similar device where rotational motion of the stem moves a body linearly between a first position and a second position. To maintain the stem and the actuator shaft axially aligned with each other, both may extend through a passage in a carrier. The passage may also house a drive nut having an inner surface shaped to correspond with a shape of an outer surface of the stem. Thus, when the shaft rotates the stem, the stem is guided along a linear path through the carrier via the drive nut.

Although the above-described device generally operates adequately, it may be improved. In particular, in some cases, the drive nut may become displaced within the carrier. As a result, the stem may become misaligned relative to the actuator shaft, and the device may not operate as desired. In some cases, a bearing assembly may be mounted on an outer surface of the carrier to allow the device to operate despite the misalignment between the actuator shaft and the stem. However, prolonged misalignment between the shaft and the stem may cause the carrier to apply excessive radial forces against bearings of the bearing assembly and/or may cause an undesirable side load against the carrier. Consequently, performance of the device may be affected.

Hence, it is desirable to provide a mechanism for coupling a stem to an actuator that allows the stem and the actuator to operate despite misalignment therebetween. It is also desirable for the mechanism to compensate for the aforementioned misalignment without applying unwanted radial forces and/or side loads against the actuator, the stem, and/or surrounding components. Moreover, it is desirable for the mechanism to be simple to implement into existing devices.

BRIEF SUMMARY

The inventive subject matter provides assemblies and methods for use in coupling a component to an actuator, the component including a stem and a drive nut, the stem configured to be rotated by the actuator and to move linearly through an opening in the drive nut, the drive nut having an outer surface.

In one embodiment, and by way of example only, the assembly includes a coupling mechanism, a drive ring, and a carrier. The coupling mechanism includes an opening, a first end, a second end, an inner surface, and a first set of slots. The opening extends between the first end and the second end and is defined by the inner surface. The inner surface is configured to mate with the drive nut outer surface, and the first set of slots are formed in the first end. The drive ring includes a first face and a second face. The first face includes a first set of projections thereon, and the first set of projections are configured to mate with the first set of slots of the coupling mechanism. The second face includes a second set of projections thereon. The carrier is configured to be coupled to the actuator and includes a main body having an inner surface defining a passage and a shelf therein. The passage is configured to receive the drive nut, the coupling mechanism, the drive ring, and a portion of the actuator therein. The shelf extends radially inwardly from the main body inner surface and includes a face having a second set of slots therein. The second set of slots are configured to mate with the second set of projections of the drive ring.

In another embodiment, by way of example only, the assembly includes a stem, a drive nut, a coupling mechanism, a drive ring, a carrier, and an actuator. The stem includes an outer surface. The drive nut includes an inner surface and an outer surface, and the drive nut inner surface mates with the outer surface of the stem. The coupling mechanism includes an opening, a first end, a second end, an inner surface, and a first set of slots. The opening extends between the first end and the second end and is defined by the inner surface. The inner surface is configured to mate with the drive nut outer surface, and the first set of slots is formed in the first end. The drive ring includes a first face and a second face, and the a first set of projections thereon configured to mate with the first set of slots of the coupling mechanism, and the second face includes a second set of projections thereon. The carrier includes a main body having an inner surface defining a passage and a shelf therein, where the passage is configured to receive the drive nut, the coupling mechanism, and the drive ring therein, and the shelf extends radially inwardly from the main body inner surface an includes a face having a second set of slots therein. The second set of slots are configured to mate with the second set of projections of the drive ring. The actuator includes a shaft that is disposed at least partially in the carrier passage.

In still another embodiment, by way of example only, a method of coupling a component to an actuator is provided. The method includes mounting a coupling mechanism to a drive nut, the drive nut mounted to a stem extending from the component, the coupling mechanism including an opening, a first end, a second end, an inner surface, and a first set of slots, the opening extending between the first end and the second end and defined by the inner surface, the inner surface configured to mate with the drive nut outer surface, and the first set of slots formed in the first end. The method may also include fitting a drive ring onto the coupling mechanism, the drive including a first face and a second face, the first face including a first set of projections thereon, the first set of projections mated with the first set of slots of the coupling mechanism, and the second face including a second set of projections thereon. The method may further include positioning a portion of a shaft extending from the actuator in a passage of a carrier, the carrier including a main body having an inner surface defining the passage and a shelf therein, the passage configured to receive the drive nut, the coupling mechanism, and the drive ring therein, and the shelf extending radially inwardly from the main body inner surface and including a face having a second set of slots therein. The method may additionally include disposing the carrier over the drive ring and the coupling mechanism such that the second set of slots mates with the second set of projections.

Other independent features and advantages of the preferred assemblies and methods will become apparent from the following detailed description, taken in conjunction with the accompanying drawings which illustrate, by way of example, the principles of the inventive subject matter.

DETAILED DESCRIPTION OF A PREFERRED EMBODIMENT

The following detailed description of the inventive subject matter is merely exemplary in nature and is not intended to limit the inventive subject matter or the application and uses of the inventive subject matter. Furthermore, there is no intention to be bound by any theory presented in the preceding background of the inventive subject matter or the following detailed description of the inventive subject matter.

Figure 1:
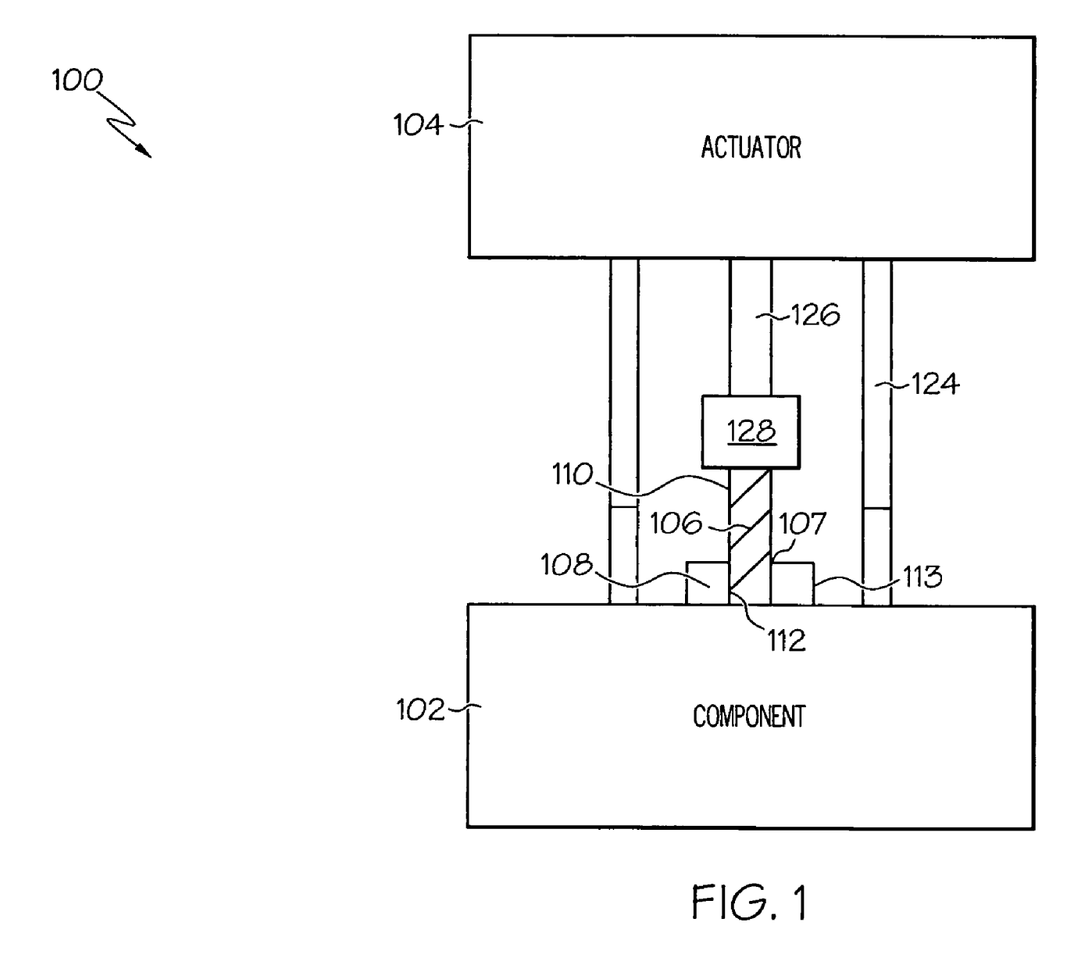
FIG. 1 is a schematic of an assembly including a component driven by an actuator, according to an embodiment.
Figure 2:
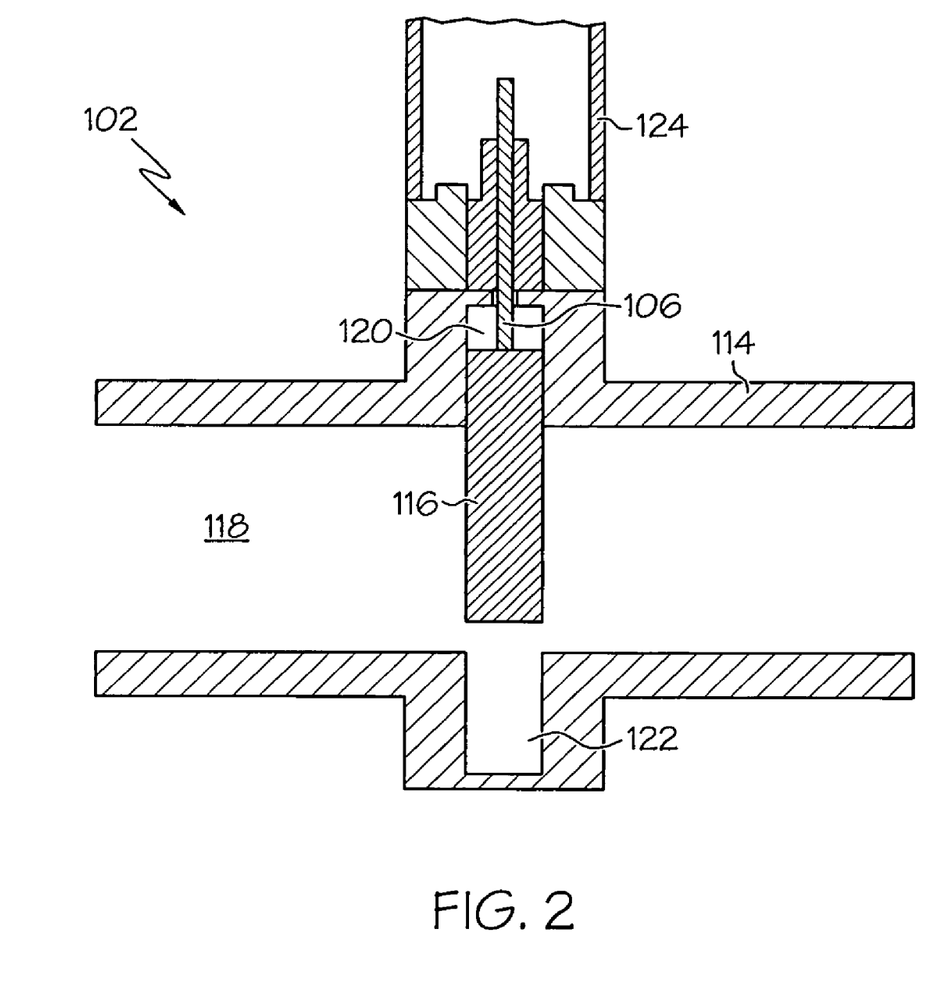
FIG. 2 is a simplified cross-sectional view of a valve that may be employed as part of the assembly of FIG. 1, according to an embodiment.

FIG. 1 is a schematic of an assembly 100 having a component 102 driven by an actuator 104. The assembly 100 may be any type of device in which rotational motion of an actuator 104 is translated into linear motion for driving a component 102. For example, the assembly 100 may be a poppet-style valve or a gate valve in which a valve element is moved into and out of a flowpath, or a printing press or stamping machine in which a block is moved onto and off of a substrate to be printed, or any other similar type of device. A cross-sectional view of an embodiment in which the driven component 102 is a valve is shown in FIG. 2. Here, the component 102 may include a valve body 114, a valve element 116, and a stem 106. The valve body 114 includes a passage 118 through which fluid may flow and may also include two cavities 120, 122 that are formed radially outwardly from the passage 118. The valve element 116 is disposed in the passage 118 and coupled to the stem 106. Thus, when the stem 106 rotates, it selectively positions the valve element 116 at least partially within one of the cavities 120, 122 or the passage 118. Referring also to FIG. 1, the stem 106 extends through an opening of the valve body 114 and into a hollow portion of a housing 124 that is mounted to the valve body 114.

In an embodiment, the stem 106 is coupled to and driven by a shaft 126 of the actuator 104, as depicted in FIG. 1. As the shaft 126 rotates, the stem 106 rotates in response thereto and travels linearly through an opening 107 in an drive nut 108. In an embodiment, the stem 106 may have an outer surface 110 shaped to correspond with and a shape of an inner surface 112 of the drive nut 108. For example, the stem 106 may have a threaded outer surface 110, and the drive nut inner surface 112 may have a corresponding threaded surface. The drive nut 108 may have a conventionally-shaped outer surface 113, and, for example, may have a hexagonally-shaped circumference.

The stem 106 may be coupled to the shaft 126 via a coupling assembly 128. An exemplary coupling assembly 128 is provided in cross-sectional and exploded views in FIGS. 3 and 4. The coupling assembly 128 may include a cover 132, a coupling mechanism 134, a drive ring 136, and a carrier 138. The cover 132 has a first side 140 and a second side 142 between which an opening 144 extends. The first side 140 may be configured to mount to the housing 124 to thereby position at least a portion of the drive nut 108, the coupling mechanism 134, the drive ring 136, and carrier 138 between the component 102 (FIG. 1) and the actuator 104 (FIG. 1).

Figure 3:
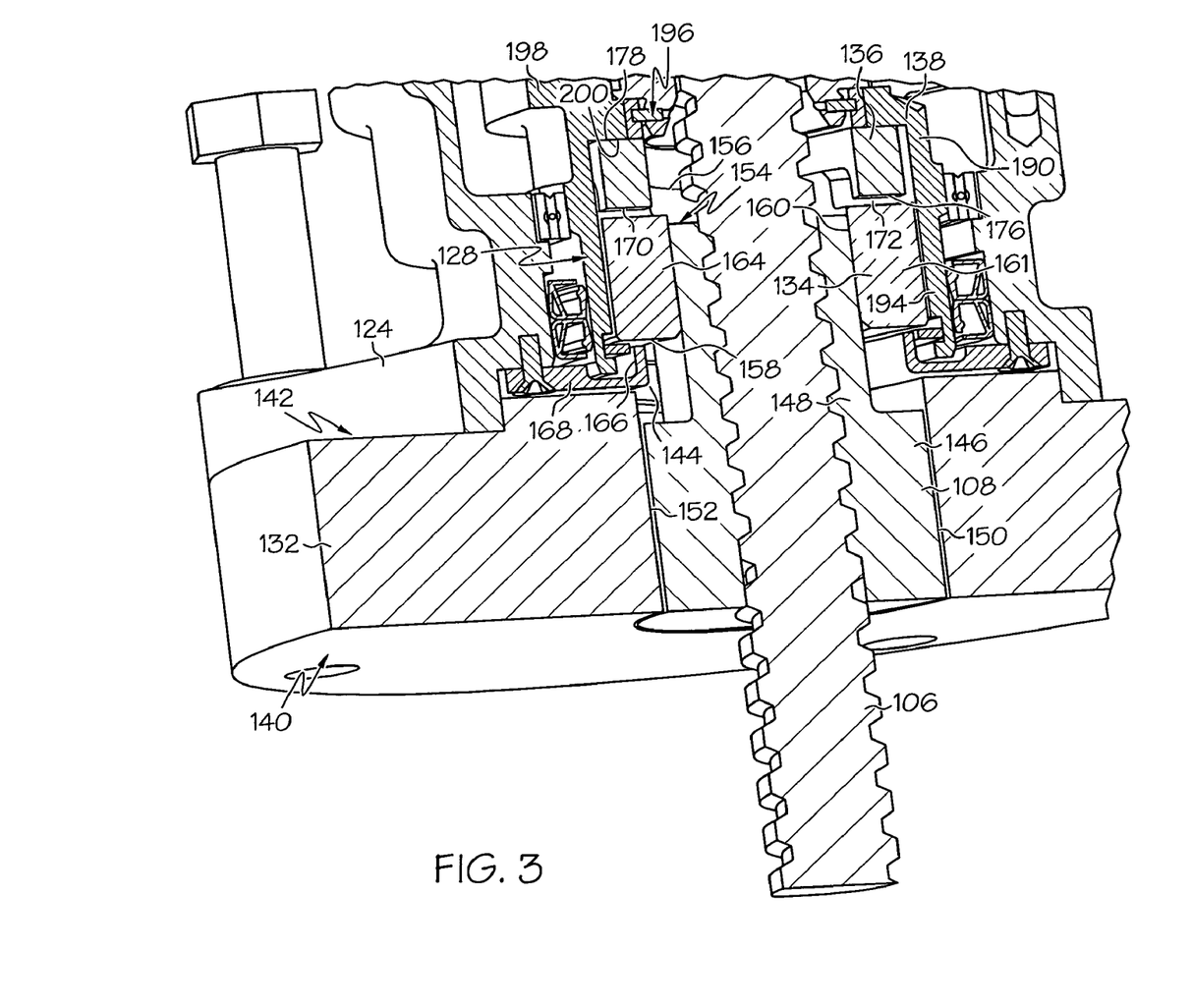
FIG. 3 is a cross-sectional view of a coupling assembly for coupling a stem of the component to a shaft of the actuator, according to an embodiment.
Figure 4:
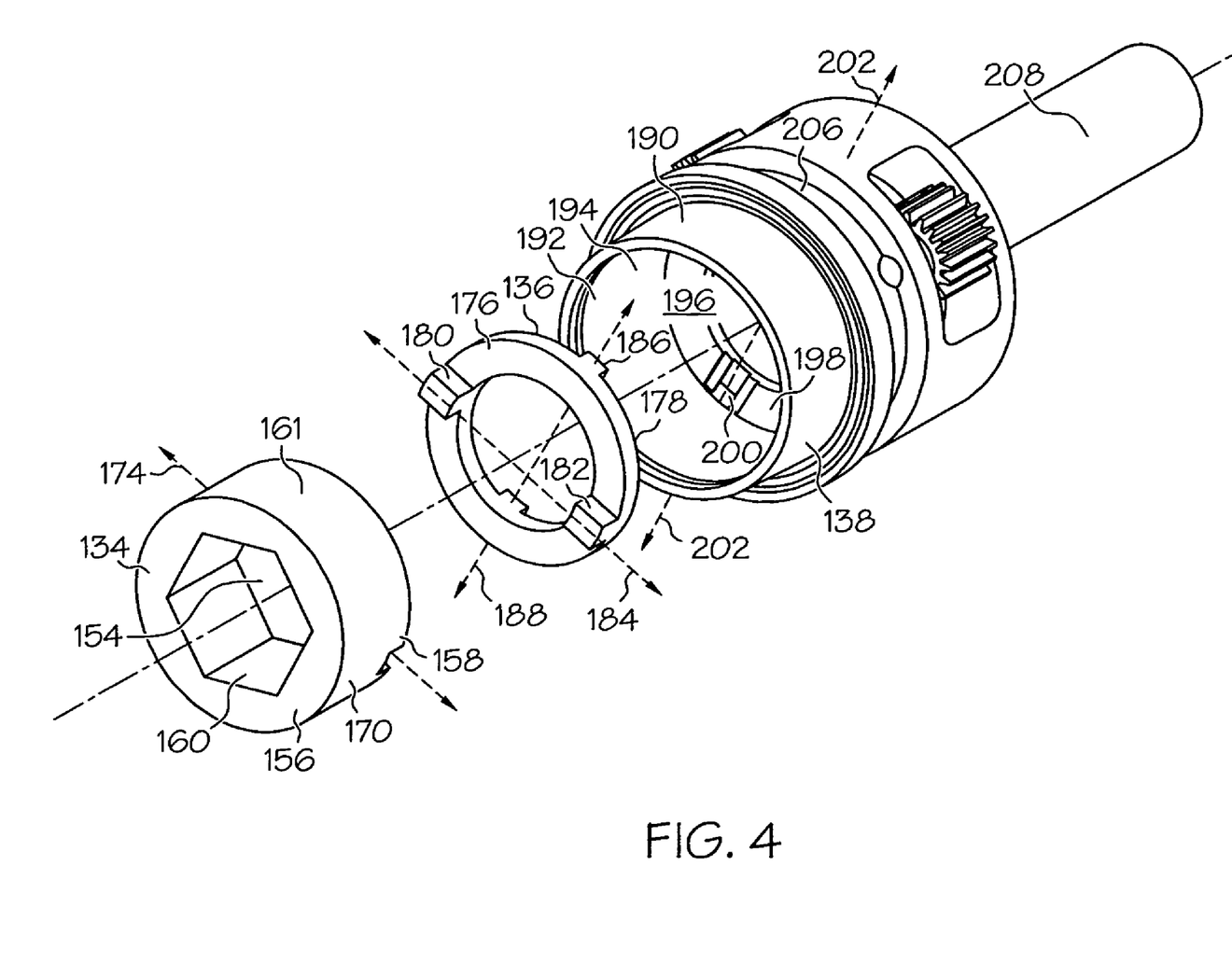
FIG. 4 is an exploded view of the coupling assembly, according to an embodiment.

The opening 144 is configured to receive at least a portion of the drive nut 108 and the stem 106. In an embodiment, the drive nut 108 may include a first axial section 146 and a second axial section 148, where the first axial section 146 has an outer surface 150 that is shaped to correspond with a shape of an inner surface 152 of the cover 132. The second axial section 148 may extend axially away from the first axial section 146.

The coupling mechanism 134 is disposed adjacent the drive nut 108 and the cover 132. In an embodiment, the coupling mechanism 134 is ring-shaped and has an opening 154, a first end 156, and a second end 158. The opening 154 extends between the first and second ends 156, 158 and is suitably sized to allow at least a portion of the second axial section 148 of the drive nut 108 to extend therethrough. In an embodiment, such as shown in FIG. 3, the inner surface 160 of the coupling mechanism 134 defining the opening 154 may have a shape that corresponds with that of the outer surface 150 of the drive nut second axial section 148. A washer 168 may be disposed between the coupling mechanism 134 and the cover 134 and may include a flange 166 extending therefrom. The flange 166 may be disposed within a groove 164 formed on the first end 156 of the coupling mechanism 134.

The second end 158 may include a first set of slots 170, 172 formed therein. In an embodiment, each slot 170, 172 may have a radial length that extends from the inner surface 160 of the coupling mechanism 134 to an outer peripheral surface 161 thereof. In another embodiment, the first set of slots 170, 172 may not extend to the outer peripheral surface 161, but instead, may extend to a location adjacent thereto. In any case, the first set of slots 170, 172 is disposed along a first radially extending axis 174 that extends radially across the second end 158. Although two slots 170, 172 are shown in the embodiment depicted in FIG. 3, fewer or more slots may alternatively be employed.

The drive ring 136 is adjacent the coupling mechanism 134 and has a first face 176 and a second face 178. The first face 176 has a first set of projections 180, 182 formed thereon that is configured to mate with the first set of slots 170, 172. Accordingly, the first set of projections 180, 182 is disposed along a second radially extending axis 184 that extends radially across the first face 176. The second radially extending axis 184 may be configured to be substantially parallel to the first radially extending axis 174, in an embodiment. Although two projections 180, 182 are shown, fewer or more may alternatively be included, depending on the number of slots 170, 172 formed on the coupling mechanism second end 158.

The second face 178 has a second set of projections 186, 188 formed thereon. The second set of projections 186, 188 is disposed along a third radially extending axis 192 that extends radially across the second face 178. The third radially extending axis 192 may be non-parallel relative to the second radially extending axis 184. In an embodiment, the third radially extending axis 192 may be substantially perpendicular to the second radially extending axis 184. In other embodiments, the third radially extending axis 192 may be at between a ___° and a ___° angle relative to the second radially extending axis 184. Although two projections 186, 188 are shown, fewer or more projections may alternatively be included.

The carrier 138 is configured to be coupled to the actuator 104 and includes a main body 190 having an inner surface 194 defining a passage 196 and a shelf 198 therein. The drive nut 108, the coupling mechanism 134, and the drive ring 136 are disposed in the passage 196. The shelf 198 extends radially inwardly from the inner surface 194 and has a face 200 that contacts the coupling mechanism 134. In an embodiment, the face 200 includes a second set of slots 202 (only one of which is shown) formed therein configured to mate with the second set of projections 186, 188. Thus, the second set of slots 202 may be disposed along a fourth radially extending axis 206 that extends radially across the shelf 198 and that is configured to be substantially parallel to the third radially extending axis 192. Although two slots 202 are referred to above, fewer or more may alternatively be included, depending on the number of projections 186, 188 formed on the drive ring second face 178.

The coupling mechanism 134, drive ring 136, and carrier 138 cooperate to allow the actuator 104 to drive the stem 106. In an embodiment in which the drive nut 108, coupling mechanism 134, drive ring 136, and carrier 138 are properly positioned relative to each other, the axes 174, 184, 192, 206 all intersect and are substantially perpendicular to a longitudinal axis 208 that extends through the coupling assembly 128. However, even if the components are not aligned such that their radially extending axes 174, 184, 192, 206 intersect the longitudinal axis 208, they may operate without applying unwanted forces against each other and against other adjacent components. This may be achieved through the coupling between the first set of projections 178, 180 and corresponding first set of slots 170, 172 and the second set of projections 186, 188 and corresponding second set of slots 202. In particular, because the first set of projections 178, 180 and corresponding slots 170, 172 are configured to move axially in a first direction along parallel first and second axes 174 and 184, and the second set of projections 186, 188 and corresponding slots 202 are configured to move axially in a second direction along parallel third and fourth axes 192, 206, the drive nut 134 disposed within the coupling mechanism 134 (and hence, the stem 106) and the carrier 138 (and hence, the shaft 126) may have multiple degrees of freedom in which to move. Such a configuration allows torque from a rotating actuator shaft 126 to be transmitted into the first and second sets of projections 178, 180, 186, 188 of the drive ring 136 to thereby reduce stresses between the actuator shaft 126 and stem 106, as compared to conventional configurations.

Figure 5:
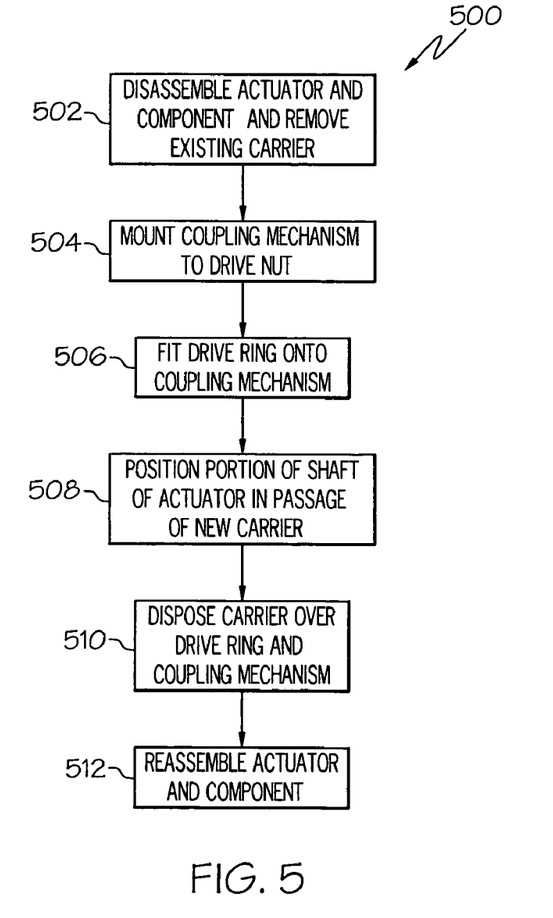
FIG. 5 is a flow diagram of a method for implementing a coupling mechanism, according to an embodiment.

The coupling mechanism 134 may be relatively simple to implement into an existing device. A method 500 of implementing the coupling mechanism 134 is shown in FIG. 5, according to an embodiment. In an embodiment, an existing actuator and component are disassembled to expose a drive nut 108, stem 106, an existing carrier, and shaft 126 and remove existing carrier, step 502. A coupling mechanism 134 is mounted to the drive nut 108, step 504. The coupling mechanism includes an opening 154, a first end 156, a second end 158, an inner surface 160, and a first set of slots 170, 172, the opening 154 extending between the first end 156 and the second end 158 and defined by the inner surface 160, the inner surface 160 configured to mate with the drive nut outer surface, and the first set of slots 170, 172 formed in the first end 156.

A drive ring 136 is then fitted onto the coupling mechanism 134, step 506. The drive ring 136 includes a first face 176 and a second face 178, the first face 176 including a first set of projections 180, 182 thereon, the second face 178 including a second set of projections 186, 188, the first set of projections 180, 182 mated with the first set of slots 170, 172 of the coupling mechanism 134. Then, a portion of a shaft 126 is positioned in a passage 196 of a carrier 138, the carrier 138 including a main body 190 having an inner surface 194 defining the passage 196 and a shelf 198 therein, the passage 196 configured to receive the drive nut 108, the coupling mechanism 134, and the drive ring 136 therein, and the shelf 198 extending radially inwardly from the main body inner surface 194 and including a face 200 having a second set of slots therein 202, step 508. The carrier 138 is then disposed over the drive ring 136 and the coupling mechanism 134 such that the second set of slots mates 202 with the second set of projections 186, 188, step 510. The actuator and component are then re-assembled, step 512.

A coupling assembly for coupling a stem to an actuator has been provided that may allow the stem to be driven by the actuator despite a misalignment therebetween. The coupling assembly may compensate for the aforementioned misalignment without applying unwanted radial forces and/or side loads against the actuator, the stem, and/or surrounding components. Additionally, the coupling assembly may be easily and inexpensively retrofitted into existing devices in which a stem is to be coupled to an actuator.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. An assembly for use in coupling a component to an actuator, the component including a stem and a drive nut, the stem configured to be rotated by the actuator and to move linearly through an opening in the drive nut, the drive nut having an outer surface, the assembly comprising:

a coupling mechanism including an opening, a first end, a second end, an inner surface, and a first set of slots, the opening extending between the first end and the second end and defined by the inner surface, the inner surface configured to mate with the drive nut outer surface, and the first set of slots formed in the first end;

a drive ring including a first face and a second face, the first face including a first set of projections thereon, the first set of projections configured to mate with the first set of slots of the coupling mechanism, and the second face including a second set of projections thereon; and a carrier configured to be coupled to the actuator, the carrier including a main body having an inner surface defining a passage and a shelf therein, the passage configured to receive the drive nut, the coupling mechanism, the drive ring and a portion of the actuator therein, and the shelf extending radially inwardly from the main body inner surface and including a face having a second set of slots therein, the second set of slots configured to mate with the second set of projections of the drive ring.

2. The assembly of claim 1, wherein:
the first set of projections is disposed along a first radially extending axis extending radially across the first face of the drive ring;
the second set of projections is disposed along a second radially extending axis extending radially across the second face of the drive ring; and
the first and the second radial axes are non-parallel relative to each other.

3. The assembly of claim 2, wherein:
the first and the second radial axes are disposed substantially perpendicular to each other.

4. The assembly of claim 2, wherein:
a longitudinal axis extends through the assembly;
the first and the second radial axes intersect the longitudinal axis;
the first set of slots is disposed along a third radially extending axis extending radially across the first end of the coupling mechanism; and
the third radially extending axis intersects the longitudinal axis.

5. The assembly of claim 4, wherein:
the second set of slots is disposed along a fourth radially extending axis extending radially across the shelf face of the carrier; and
the fourth radially extending axis intersects the longitudinal axis.

6. The assembly of claim 1, wherein the first and the second sets of projections each include two projections.

7. The assembly of claim 1, wherein:
the coupling mechanism includes an outer peripheral surface; and
each slot of the first set of slots extends from the inner surface of the coupling mechanism to a location adjacent the outer peripheral surface of the coupling mechanism.

8. The assembly of claim 1, wherein:
the coupling mechanism includes an outer peripheral surface; and
each slot of the first set of slots extends from the inner surface of the coupling mechanism to the outer peripheral surface of the coupling mechanism.

9. An assembly comprising:
a stem including an outer surface;
a drive nut including an inner surface and an outer surface, the drive nut inner surface mating with the outer surface of the stem;
a coupling mechanism including an opening, a first end, a second end, an inner surface, and a first set of slots, the opening extending between the first end and the second end and defined by the inner surface, the inner surface configured to mate with the drive nut outer surface, and the first set of slots formed in the first end;
a drive ring including a first face and a second face, the first face including a first set of projections thereon, the first set of projections configured to mate with the first set of slots of the coupling mechanism, and the second face including a second set of projections thereon;
a carrier including a main body having an inner surface defining a passage and a shelf therein, the passage configured to receive the drive nut, the coupling mechanism, and the drive ring therein, and the shelf extending radially inwardly from the main body inner surface an including a face having a second set of slots therein, the second set of slots configured to mate with the second set of projections of the drive ring; and
an actuator including a shaft, the shaft disposed at least partially in the carrier passage.

10. The assembly of claim 9, wherein:
the first set of projections is disposed along a first radially extending axis extending radially across the first face of the drive ring;
the second set of projections is disposed along a second radially extending axis extending radially across the second face of the drive ring; and
the first and the second radial axes are non-parallel relative to each other.

11. The assembly of claim 10, wherein:
the first and the second radial axes are disposed substantially perpendicular to each other.

12. The assembly of claim 11, wherein:
a longitudinal axis extends through the assembly;
the first and the second radial axes intersect the longitudinal axis;
the first set of slots is disposed along a third radially extending axis extending radially across the first end of the coupling mechanism; and
the third radially extending axis intersects the longitudinal axis.

13. The assembly of claim 12, wherein:
the second set of slots is disposed along a fourth radially extending axis extending radially across the shelf face of the carrier; and
the fourth radially extending axis intersects the longitudinal axis.

14. The assembly of claim 9, wherein the first and the second sets of projections each include two projections.

15. The assembly of claim 9, wherein:
the coupling mechanism includes an outer peripheral surface; and
each slot of the first set of slots extends from the inner surface of the coupling mechanism to a location adjacent the outer peripheral surface of the coupling mechanism.

16. The assembly of claim 9, wherein:
the coupling mechanism includes an outer peripheral surface; and
each slot of the first set of slots extends from the inner surface of the coupling mechanism to the outer peripheral surface of the coupling mechanism.

17. The assembly of claim 9, further comprising a valve, the valve including a valve element coupled to the stem.

18. A method of coupling a component to an actuator, the method comprising the steps of:
mounting a coupling mechanism to a drive nut, the drive nut mounted to a stem extending from the component, the coupling mechanism including an opening, a first end, a second end, an inner surface, and a first set of slots, the opening extending between the first end and the second end and defined by the inner surface, the inner surface configured to mate with the drive nut outer surface, and the first set of slots formed in the first end;
fitting a drive ring onto the coupling mechanism, the drive including a first face and a second face, the first face including a first set of projections thereon, the first set of projections mated with the first set of slots of the coupling mechanism, and the second face including a second set of projections thereon;
positioning a portion of a shaft extending from the actuator in a passage of a carrier, the carrier including a main body having an inner surface defining the passage and a shelf therein, the passage configured to receive the drive nut, the coupling mechanism, and the drive ring therein, and the shelf extending radially inwardly from the main body inner surface and including a face having a second set of slots therein; and disposing the carrier over the drive ring and the coupling mechanism such that the second set of slots mates with the second set of projections.

19. The method of claim 18, further comprising:
disassembling the existing actuator and the component to expose the drive nut, the stem, an existing carrier, and the shaft; and
removing the existing carrier.

20. The method of claim 18, further comprising the step of re-assembling the actuator and the component.

* * * * *